No. 618,760. Patented Jan. 31, 1899.
H. ABBOTT.
EYEGLASSES OR SPECTACLES.
(Application filed Oct. 21, 1897.)
(No Model.)
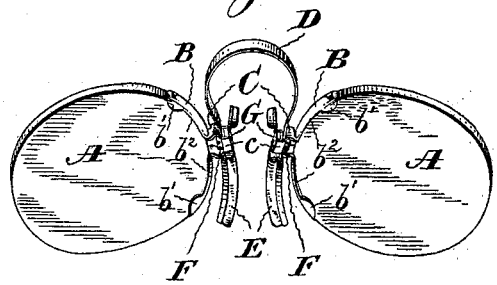
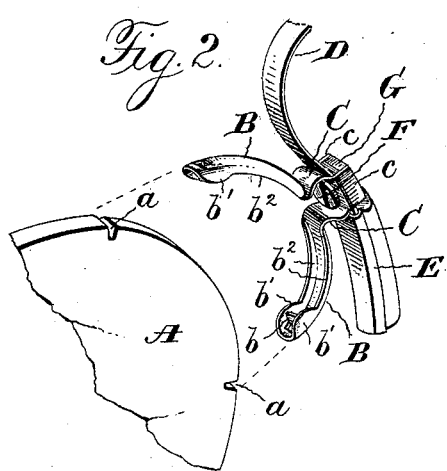
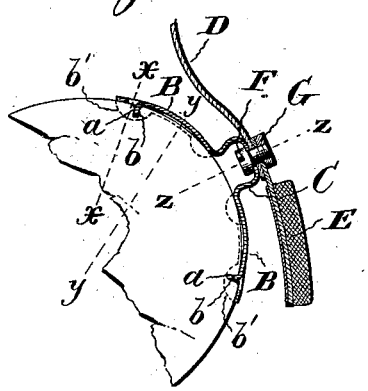
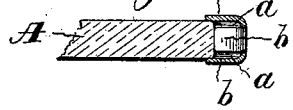
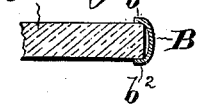
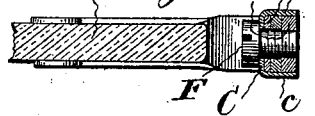
Witnesses:
Jas E Hutchinson.
Chas J Williamson.
Inventor.
Henry Abbott, by
Crindle and Russell his Attys

UNITED STATES PATENT OFFICE.

HENRY ABBOTT, OF NEW YORK, N. Y.

EYEGLASSES OR SPECTACLES.

SPECIFICATION forming part of Letters Patent No. 618,760, dated January 31, 1899.

Application filed October 21, 1897. Serial No. 655,918. (No model.)

*To all whom it may concern:*

Be it known that I, HENRY ABBOTT, of New York, in the county of New York, and in the State of New York, have invented certain new and useful Improvements in Eyeglasses or Spectacles; and I do hereby declare that the following is a full, clear, and exact description thereof, reference being had to the accompanying drawings, in which—

Figure 1 is a perspective view of a pair of eyeglasses embodying my invention; Fig. 2, a detail perspective view of a portion of one of the lenses and the spring and nose-piece attaching strap therefor, with the parts shown separated from each other. Fig. 3 is a sectional view of the same combined, the section being on a plane parallel with the face of the lens. Fig. 4 is a section on the line $x\,x$ of Fig. 3; Fig. 5, a section on the line $y\,y$ of Fig. 3, and Fig. 6 a section on the line $z\,z$ of Fig. 3.

Letters of like name and kind refer to like parts in each of the figures.

The object of my invention is to provide for the fastening to the lenses of spectacles and eyeglasses of the kind commonly known as "frameless" of the parts of frames that are necessary by means that will be of cheap manufacture and yet entirely efficient, will require neither the use of cement nor the drilling of holes through the lens, be capable of each attachment and separation and yet be strongly and firmly united to the lens, and by overlapping the lens to a minimum degree give virtually a field of vision through the entire lens; and to this end said invention consists in the means employed having the features of construction, substantially as hereinafter specified.

I illustrate my invention as applied to eyeglasses and only for the fastening to the two lenses of the spring and nose-pieces; but it is to be understood that the invention may be embodied in spectacles and for fastening to the lenses of eyeglasses other parts than those mentioned.

In the embodiment of my invention, as illustrated, the inner end of each lens A has cut into the edge at points equidistant from the longitudinal axis of the lens two small notches $a$ and $a$, that extend in lines that diverge from each other, into each of which projects one of two lugs or teats $b$ and $b$ at the extremities of a metal strap B extending partially around the edge of the lens. Each lug $b$ is formed by cutting the strap so as to partially sever a piece therefrom, and then bending said piece to cause it to project at the desired angle from the strap. The cuts are preferably wholly within the body of the strap, so that no small or weak projections will be formed thereon in danger of catching into objects and being broken. Adjacent to each lug $b$ the strap is provided on each side with an inwardly-turned flap or lip $b'$, that extends sufficiently far over the side surface or face of the lens as to completely cover and conceal the notch in the lens. The lips $b'$ and $b'$ at the extremities of the strap are inadequate to sustain the lateral strain of the lens, and hence the latter, if supported by them alone, could rock or swing to and fro relative to the strap. To rigidly hold the lens from such movement and also to add strength to the strap, the opposite sides of the latter are bent inward to form narrow flanges $b^2$ and $b^2$ to slightly overlap the opposite faces of the lens, and thus firmly support the latter against any tendency to move laterally.

If desired, the lips $b'$ and $b'$ can be used at intermediate points as well as at the extremities of the strap, as indicated in Fig. 3; but ordinarily this will only be necessary with lenses of unusal thickness.

At its longitudinal center the strap is bent to form a loop-shaped projection C to permit the attachment in the manner, to be presently described, of the spring and the nose clamps or pieces and also to enable the strap-lugs $b$ and $b$ to be readily sprung into and out of engagement with the lens-notches $a$ and $a$, as the flanges $b^2$ and $b^2$, which terminate at said loop, render the lens-engaging portions of the strap so rigid as to make it difficult for them to yield for the purpose named. On its opposite sides the vertical member of the loop has parallel ears $c$ and $c$, between which are placed one end of the spring D and the upper end of one of the nose-engaging clamps E, the same being held therein by means of a screw F and a nut G, the latter being also placed between said ears and thereby held from turning, and the head of the screw being inside of the loop C. By placing the head of the screw on the inside of the loop the screw cannot work loose, as it can when the head is on the outside and is affected by the constant moving of the spring and nose piece or clamp, and the removal of the screw-head from the outside obviates the annoyance and discomfort to persons with fleshy noses, due to the digging or pressing of the projecting screw-head into the flesh.

Owing to the divergence of the lens-slots $a$ and $a$ it will be apparent that the tendency of any pull on the strap intermediate its ends will be simply to tighten the grip of the strap-lugs in the notches, yet when it is desired to remove a strap from its lens it is simply necessary to pull one end of the strap in a direction in line with the direction of the slot at such end, whereupon the strap, yielding at the loop C, will be instantly freed from the lens.

Having thus described my invention, what I claim is—

1. The combination of a lens having diverging notches in its edge, and a strap on the lens provided with a projection for each notch, and a lip extending over each face of the lens, that covers the notch, substantially as and for the purpose specified.

2. The combination of a lens having diverging notches in its edge, and a strap on the lens, provided with a projection for each notch, formed by partially severing the strap wholly within its body and bending the partially-severed part to the desired position, and the strap having on each side a lip that covers the notch, substantially as and for the purpose described.

3. The combination of a lens having diverging notches in its edge, and a strap on the lens provided with a projection for each notch and having flanges or projections that overlap the opposite faces of the lens and have an extended engagement therewith, whereby the lens is firmly held from lateral movement relative to the strap, substantially as and for the purpose set forth.

4. The combination of a lens having diverging notches in its edge, and a strap extending partially around the lens along the edge thereof, having at its extremities projections that, respectively, enter said notches, and provided with inwardly-turned flanges on opposite sides overlapping the lens-faces, and having at or near its mid-length an elastic loop to permit flexing of the strap for engaging or disengaging the projections and notches, substantially as and for the purpose described.

5. The combination of the lens, a strap attached to the same having a loop, and a nose-clamping bow or spring attached to the loop by a screw whose head is on the inside of the loop, and the loop being interposed between said bow or spring and the screw-head, substantially as and for the purpose described.

6. The combination of a lens, a strap attached to the same, having a loop, flanges projecting outwardly from the latter, parts placed between such flanges, one of which is a nut and the other a nose-piece, and a screw for fastening such parts to the loop whose head is on the inner side of the loop, substantially as and for the purpose shown.

In testimony that I claim the foregoing I have hereunto set my hand this 18th day of October, 1897.

HENRY ABBOTT.

Witnesses:
JOHN F. SHELLY,
EARLE T. CONNET.

It is hereby certified that in Letters Patent No. 618,760, granted January 31, 1899, upon the application of Henry Abbott, of New York, N. Y., for an improvement in "Eyeglasses or Spectacles," errors appears in the printed specification requiring correction, as follows: On page 1, line 30, the word "each" should read *easy;* and same page, line 83, the word "unusal" should read *unusual;* and that the said Letters Patent should be read with these corrections therein that the same may conform to the record of the case in the Patent Office.

Signed, countersigned, and sealed this 7th day of February, A. D., 1899.

[SEAL.]                                           WEBSTER DAVIS,
*Assistant Secretary of the Interior.*

Countersigned:
    C. H. DUELL,
        *Commissioner of Patents.*